(12) United States Patent
Adelberger et al.

(10) Patent No.: US 9,660,458 B2
(45) Date of Patent: May 23, 2017

(54) ELECTRICAL LOAD MANAGEMENT

(71) Applicant: Google Inc., Mountain View, CA (US)

(72) Inventors: Kurt Adelberger, San Mateo, CA (US);
Wolf-Dietrich Weber, San Jose, CA (US); Ana Radovanovic, Mountain View, CA (US); Ross Koningstein, Atherton, CA (US); David K. Fork, Mountain View, CA (US); Mikhail Dikovsky, San Jose, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 14/444,535

(22) Filed: Jul. 28, 2014

(65) Prior Publication Data

US 2015/0326023 A1 Nov. 12, 2015

Related U.S. Application Data

(60) Provisional application No. 61/989,141, filed on May 6, 2014.

(51) Int. Cl.
*H02J 1/10* (2006.01)
*H02J 3/46* (2006.01)
(Continued)

(52) U.S. Cl.
CPC ...... *H02J 5/00* (2013.01); *H02J 3/06* (2013.01); *H02J 3/14* (2013.01); *H02J 3/38* (2013.01);
(Continued)

(58) Field of Classification Search
CPC ........ H02J 3/06; H02J 3/14; H02J 4/00; H02J 5/00
(Continued)

(56) References Cited

U.S. PATENT DOCUMENTS 3,558,911 A 1/1971 Chen
3,993,984 A 11/1976 Penrod
(Continued)

FOREIGN PATENT DOCUMENTS

WO 2009/072985 6/2009
WO 2011/081943 7/2011
WO 2013/192432 12/2013

OTHER PUBLICATIONS

International Search Report and Written Opinion International Application No. PCT/US2015/029249, mailed Jul. 16, 2015, 10 pages.
(Continued)

*Primary Examiner* — Carlos Amaya
(74) *Attorney, Agent, or Firm* — Fish & Richardson P.C.

(57) ABSTRACT

Methods, systems, and apparatus, including computer programs encoded on computer storage media, for electrical load management. One of the systems includes a first electrical grid, one or more power sources coupled to the first electrical grid, a second electrical grid coupled to the first electrical grid by a power conversion system, one or more loads coupled to the second electrical grid, and one or more load control systems coupled to the one or more loads. A grid control system is configured to receive source information from the first electrical grid and send load instructions to the load control systems based on the source information.

20 Claims, 8 Drawing Sheets

(51) Int. Cl.
*H02J 5/00* (2016.01)
*H02J 4/00* (2006.01)
*H02J 3/06* (2006.01)
*H02J 3/14* (2006.01)
*H02J 3/38* (2006.01)

(52) U.S. Cl.
CPC ............ *H02J 4/00* (2013.01); *Y02B 70/3225* (2013.01); *Y04S 20/222* (2013.01); *Y10T 307/352* (2015.04)

(58) Field of Classification Search
USPC .......................................................... 307/24
See application file for complete search history.

(56) References Cited

U.S. PATENT DOCUMENTS

| | | | |
|---|---|---|---|
| 5,793,124 | A | 8/1998 | Mitzaki |
| 6,233,692 | B1 | 5/2001 | Villanueva |
| 7,047,431 | B2 | 5/2006 | Suzuki |
| 8,116,105 | B2 | 2/2012 | Klikic et al. |
| 8,237,308 | B2 | 8/2012 | Atkey et al. |
| 8,288,885 | B2 | 10/2012 | Ganev et al. |
| 8,428,805 | B2 | 4/2013 | Bailey et al. |
| 8,432,059 | B2 | 4/2013 | Waite et al. |
| 8,542,685 | B2 | 9/2013 | Forbes et al. |
| 2005/0121978 | A1 | 6/2005 | McAvoy |
| 2008/0125912 | A1 | 5/2008 | Heilman et al. |
| 2008/0136581 | A1 | 6/2008 | Heilman et al. |
| 2010/0219808 | A1 | 9/2010 | Steckley et al. |
| 2012/0173033 | A1 | 7/2012 | Tischer |
| 2012/0223675 | A1 | 9/2012 | Bianco |
| 2012/0245751 | A1* | 9/2012 | Gow .................. H02J 3/14 700/291 |
| 2012/0257316 | A1 | 10/2012 | Kamor et al. |
| 2013/0006456 | A1 | 1/2013 | Thaduvayi et al. |
| 2013/0222122 | A1 | 8/2013 | Killo et al. |

OTHER PUBLICATIONS

Matt Kraning et al., "Dynamic Network Energy Management via Proximal Message Passing," Foundations and Trends in Optimization, vol. 1, No. 2 (2013) pp. 70-122.

John Schonberger et al., "Autonomous Load Shedding in a Nanogrid using DC Bus Signalling," 32nd Annual Conference on IEEE Industrial Electronics, IECON 2006, Nov. 2006, pp. 5155-5160.

Mukul C. Chandorkar et al., "Control of Parallel Connected Inverters in Standalone ac Supply Systems," IEEE Transactions on Industry Applications, vol. 29, No. 1, Jan./Feb. 1993, pp. 136-143.

Josep M. Guerrero et al., "Hierarchical Control of Droop-Controlled DC and AC Microgrids—A General Approach Towards Standardization," 35th Annual Conference of the IEEE Industrial Electronics Society, IECON 2009, Nov. 2009, pp. 4341-4346.

Alec Brooks et al., "Demand Dispatch: Using Real-Time Control of Demand to Help Balance Generation and Load," IEEE Power and Energy Magazine, vol. 8, No. 3, 2010, May/Jun. 2010, pp. 20-29.

* cited by examiner

ELECTRICAL LOAD MANAGEMENT

CROSS-REFERENCE TO RELATED APPLICATIONS

This application claims priority to U.S. Provisional Application Ser. No. 61/989,141, filed May 6, 2014, the entire contents of which are hereby incorporated by reference.

BACKGROUND

This specification relates to managing loads on an electrical grid.

An electrical grid is an interconnected network for distributing electrical power from power sources to power consumers. An electrical grid can include generating stations that produce electrical power, transmission lines that carry power over large distances to regional centers, and distribution lines that connect to individual loads. One example of an electrical grid is a microgrid that includes multiple loads and optionally power sources that can be operated in coordination with a broader public utility grid or as an electrical island.

SUMMARY

This specification describes a grid control system for an electrical grid that receives load information from each of a plurality of load control systems and determines instructions for the loads using the received load information. The grid control system sends the instructions to the load control systems which then adjust the power drawn by respective loads using the instructions and optional local conditions data.

In general, one innovative aspect of the subject matter described in this specification can be embodied in systems that include a first electrical grid; one or more power sources coupled to the first electrical grid; a second electrical grid coupled to the first electrical grid by a power conversion system; one or more loads coupled to the second electrical grid; one or more load control systems coupled to the one or more loads; and a grid control system configured to perform operations comprising: receiving source information from the first electrical grid; based on the source information, determining a respective load instruction for each of the load control systems; and sending the load instructions to the load control systems, causing each load control system to adjust the power drawn from the second electrical grid by the load control system's respective load based on the load control system's respective load instruction. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The operations include receiving load information from the load control systems, and wherein the load information characterizes at least one aspect of the power drawn by the load system's respective load, wherein determining the set of load instructions comprises using the load information from each load, so that the load instruction for at least one load control system is based on the load information from at least one other load control system.

The operations comprise determining a respective source instruction for each of one or more source control systems coupled to the power sources and sending the source instructions to the source control systems, causing each source control system to adjust the power supplied to the first electrical grid by the source control system's respective source based on the source control system's respective source instruction. Receiving source information from the first electrical grid comprises receiving a measurement of a voltage on the first electrical grid. The power conversion system comprises a direct current (DC) to alternating current (AC) inverter configured to convert DC power on the first electrical grid into AC power on the second electrical grid. Determining the load instruction for at least one load control system comprises determining a schedule for the load control system to adjust the power drawn from the second electrical grid by the load control system's respective load at a plurality of scheduled times. Determining the load instruction for at least one load control system comprises determining a schedule for the load control system to adjust the power drawn from the second electrical grid as a function of a local condition measured by the load control system. The local condition measured by the load control system comprises a measured voltage on the second electric grid, and wherein the schedule for the load control system comprises a plurality of power levels for a plurality of measured voltages. Receiving source information comprises receiving source information from each of a plurality of source control systems coupled to the power sources, and wherein the source information characterizes some aspect of the power supplied by the source control system's respective power source. The source information from the source control systems, taken together, collectively represents an envelope of power levels that the power sources can collectively provide at a plurality of times; and wherein determining the load instructions comprises calculating, for each time of the plurality of times, an optimum combination of loads based on the power level that the power sources can collectively provide at that time. Receiving source information comprises receiving source information from each of a plurality of source control systems coupled to the power sources, and wherein the source information characterizes some aspect of the power supplied by the source control system's respective power source; wherein the source information from each source control system comprises a plurality of generation prices, one for each of a plurality of power levels that the source can supply; wherein determining the set of load instructions comprises determining, for each level of power availability of a plurality of levels of power availability from the power sources, an optimal combination of loads as a function of power availability to reduce a total cost of power consumption.

Particular embodiments of the subject matter described in this specification can be implemented to realize one or more advantages. A grid control system can determine optimal load instructions for various loads coupled to an electrical grid. The total cost and/or amount of electricity used on the grid can be reduced. Electrical delivery to loads can be managed to meet load constraints and conditions and/or generation or supply constraints. This can lead to reducing the need to oversize generation equipment to handle the worst-case scenario of multiple loads all on at once. The stability of the electrical grid can be managed by sending load instructions to the loads. The probability of a critical power outage can be reduced. Over-provisioning of supply can be reduced, which, in turn, reduces the costs of electrical distribution systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

In many situations, there is not enough electricity supply to meet actual or potential demand. Examples include a home that has islanded itself during a blackout and is relying on a backup battery, or a microgrid that is reaching its capacity limits and cannot supply inrush current to a starting motor. If demand exceeds supply, voltage or frequency can go outside of their approved ranges, resulting in a trip that shuts down parts of the distribution system or damages devices that are drawing power from the system. One solution is overprovisioning supply to provide worst case levels of demand. This solution, however, is quite expensive.

This document describes systems and methods that address these and other issues. In some implementations, a controller determines capabilities, needs and priorities for connected loads and generators, runs an optimizer to calculate the optimal combination of loads given expected supply availability, cost, and capability, and sends each load/generator a communication that enables the load/generate to decide when to modify its power draw. The controller also may also preclude loads from connecting to the network if they will cause demand to exceed supply.

A measurement unit, actuator, and communications device for each load communicates with the master controller, measures local conditions and adjusts energy product/consumption in accordance with the communications received from the controller. These features and other features are described in more detail below.

Figure 1A:
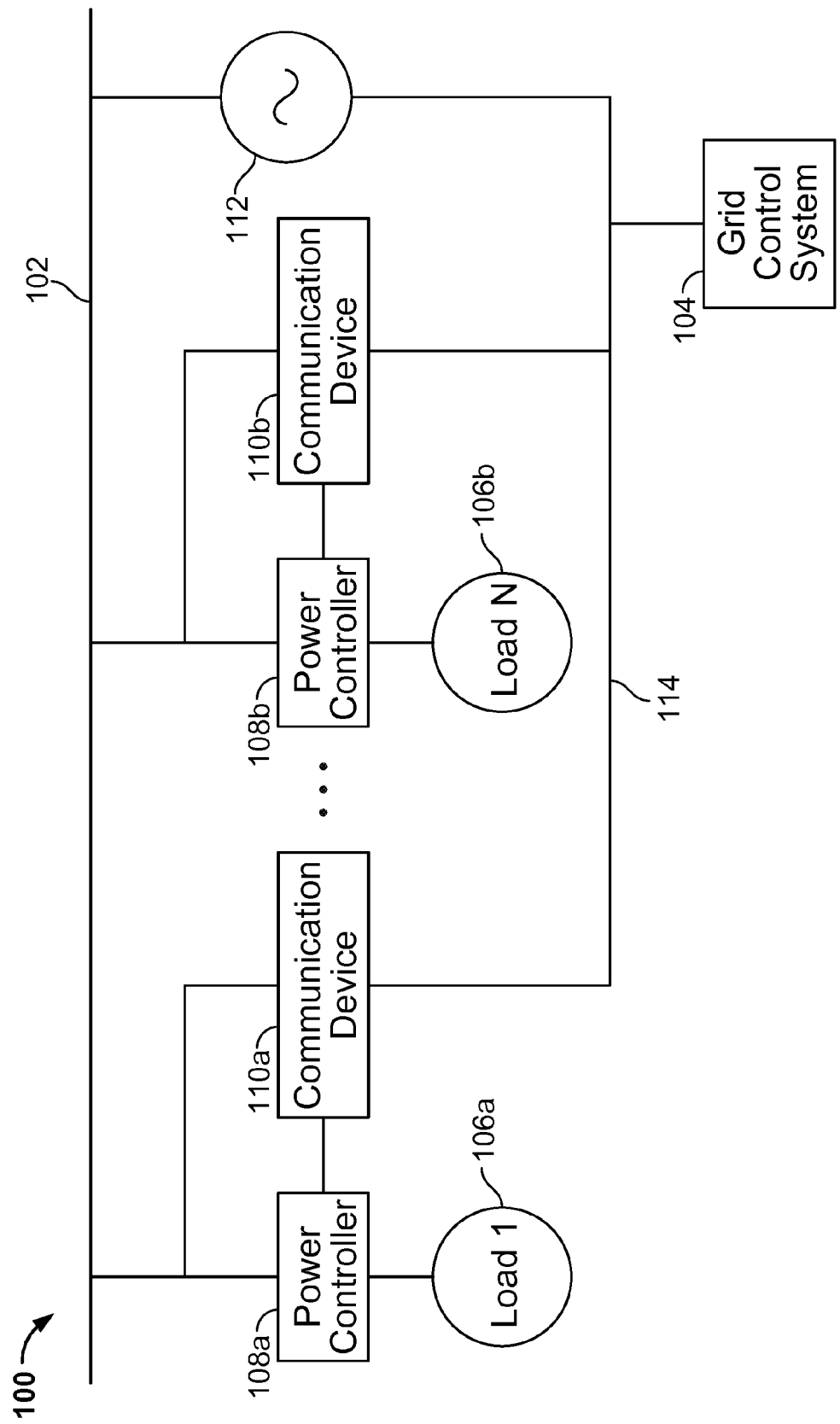
FIG. 1A is a block diagram of an example electrical system.

FIG. 1A is a block diagram of an example electrical system 100. The system includes an electrical grid 102 for delivery of electrical power to loads 106a-b. A load can be any type of device that draws electrical power, e.g., an appliance within a home, a charging device for an electrical vehicle, manufacturing equipment, and so on. A power source 112 provides power to the grid. The power source can be, e.g., a combination of one or more generators, batteries, photovoltaic (PV) panels, or other sources of power. The loads each have a respective load control system that includes a power controller 108a-b and a communications device 110a-b. The power controller is configured to adjust the load's real and, in some implementations, reactive power level in response to a signal it receives from the communications device.

The power controller can be, e.g. a switch that opens or closes, or it can be a complex power-electronic device with arbitrarily controllable real and reactive power levels, or any appropriate device that can adjust the amount of power drawn by the load. The power controller can be physically integrated with the load or it can be a separate device or integrated into another device. The power controller can be collocated with other loads' power controllers, e.g., in a home's electrical panel or sub-panel.

The communications device is configured to communicate with a grid control system 104 over a data communications network 114. The communications device sends the grid control system load information about its respective load. The load information characterizes some aspect of the power drawn by the respective load.

Examples of the load information include a priority rating for the load control system's respective load (e.g., assigned by a system engineer and programmed into the load control system), a measurement of the power being drawn by the load control system's respective load (e.g., reported by the load or measured by the load control system), and a price that the load control system's respective load will pay for an amount of power (e.g., where the load control system is in communication with another system providing price information). Priority ratings can change dynamically based on, e.g., user inputs, weather, and time or day. Other examples of the load information include state information characterizing a current state of the load control system's respective load (e.g., a house's temperature, a battery's state of charge), and one or more power constraints on the load control system's respective load (e.g., that a device has a two second lag before responding, or a device can only ramp up or down at a certain rate, or that a device can operate only if it is provided power at a certain level).

In some implementations, the grid control system also receives power source information from source control systems for power sources coupled to the grid. The source control systems are coupled to power sources and configured to adjust the amount of power supplied by the power sources. Examples of power source information includes an indication of how much power the power source can provide as a function of time, a price that the source control system's respective power source will charge for providing an amount of power, or one or more constraints on the power source's ability to provide power (e.g., a ramp rate limitation). Other constraints include for example the amount of fuel (i.e. total energy that can be supplied) and the total charge limits (as with a battery). The power source information can be based on electricity prices communicated by a local utility, information concerning a generator when running in an off-utility mode, and other measured variables on the electrical grid for the power sources.

The grid control system determines a set of load instructions including a load instruction for each of the load control systems based on the received load information and, in some cases, the received source information. The load instructions for at least one load control system, and perhaps all of the load control systems, will be based on the load information from at least one other load control system. For example, the grid control system can execute an optimization algorithm. Executing optimization algorithms is discussed further below with reference to FIG. 2.

The load instruction can be, e.g., an instruction to disconnect power to the load at a certain time or times, or an instruction to disconnect power to the load when the measured voltage on the grid falls below a threshold voltage, or an instruction for the load to consume power or connect to the electrical grid. In some implementations, the load instruction is curve specifying, e.g., various power levels to adjust the load's consumption to as a function of a measured local condition. The local condition can be, e.g., the measured voltage on the grid, the measured current on the grid, the measured frequency on the grid, or some combination of these.

The communications device for each load control system receives load instructions from the grid control system. The load control system uses the load instructions to send a signal to the power controller which in turn adjusts the amount of power used by the load. In cases where the load instruction specifies a measured local condition, the load control system measures the local condition and adjusts the power level of the load as specified by the load instruction.

Figure 1B:
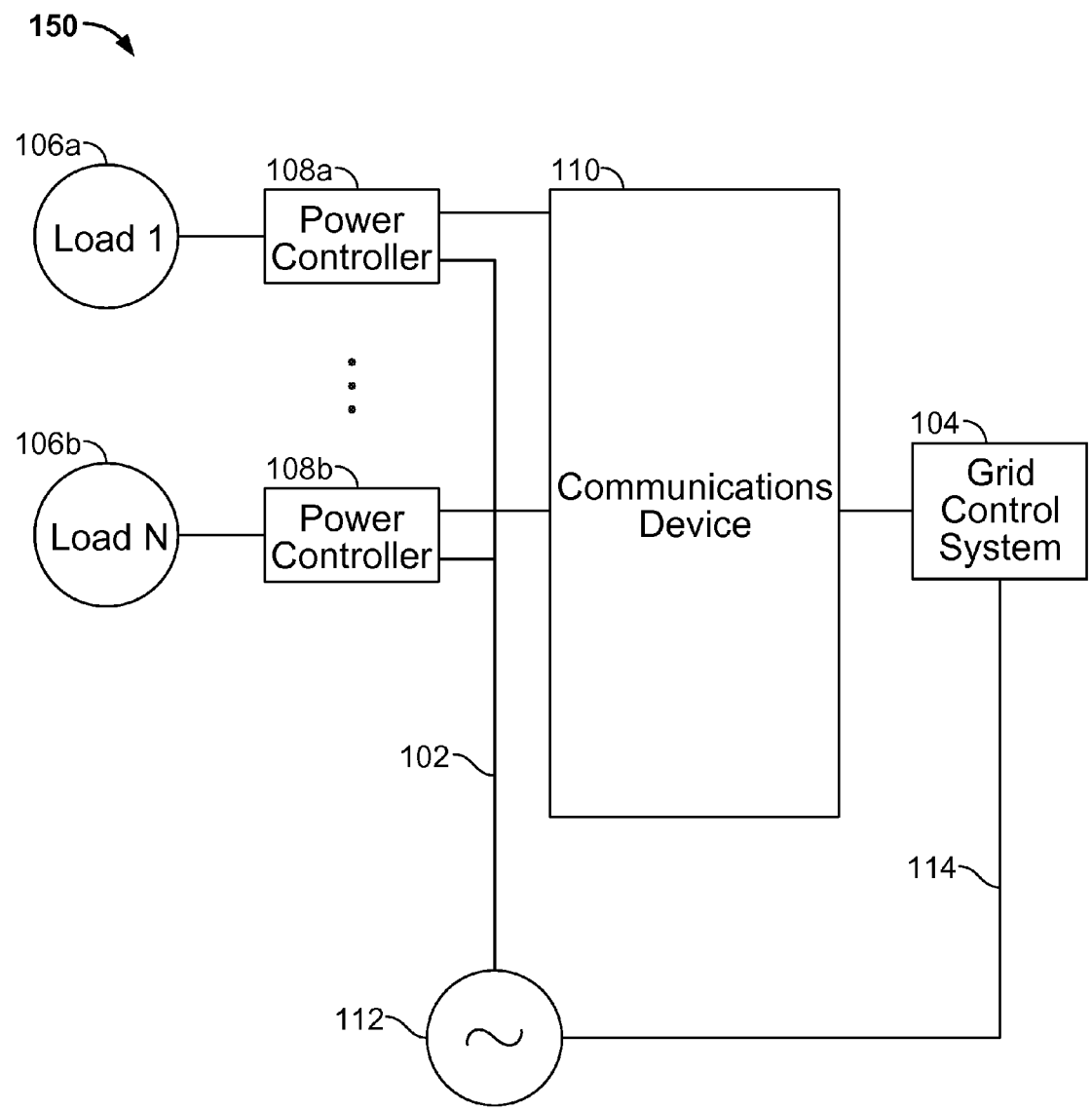
FIG. 1B is a block diagram of an example electrical system including the components of the electrical system of FIG. 1A in a different configuration.

FIG. 1B is a block diagram of an example electrical system 150 including the components of the electrical system 100 of FIG. 1A in a different configuration. In this configuration, a single communications device 110 serves multiple power controllers 108a-b. The communications device sends load information for the loads 106a-b coupled to it to the grid control system 104, and the grid control system sends load instructions to the communications device. This can be useful, for example, so that multiple communications devices are not needed for each load.

FIG. 1A illustrates an example system where each load has a respective communications device and FIG. 1B illustrates an example system where one communications device serves all the loads; however, other example systems can include various combinations of communications devices and loads. For example, a system can include one communications device serving a number of smaller loads and several communications devices, one for each of a number of larger loads.

Figure 1C:
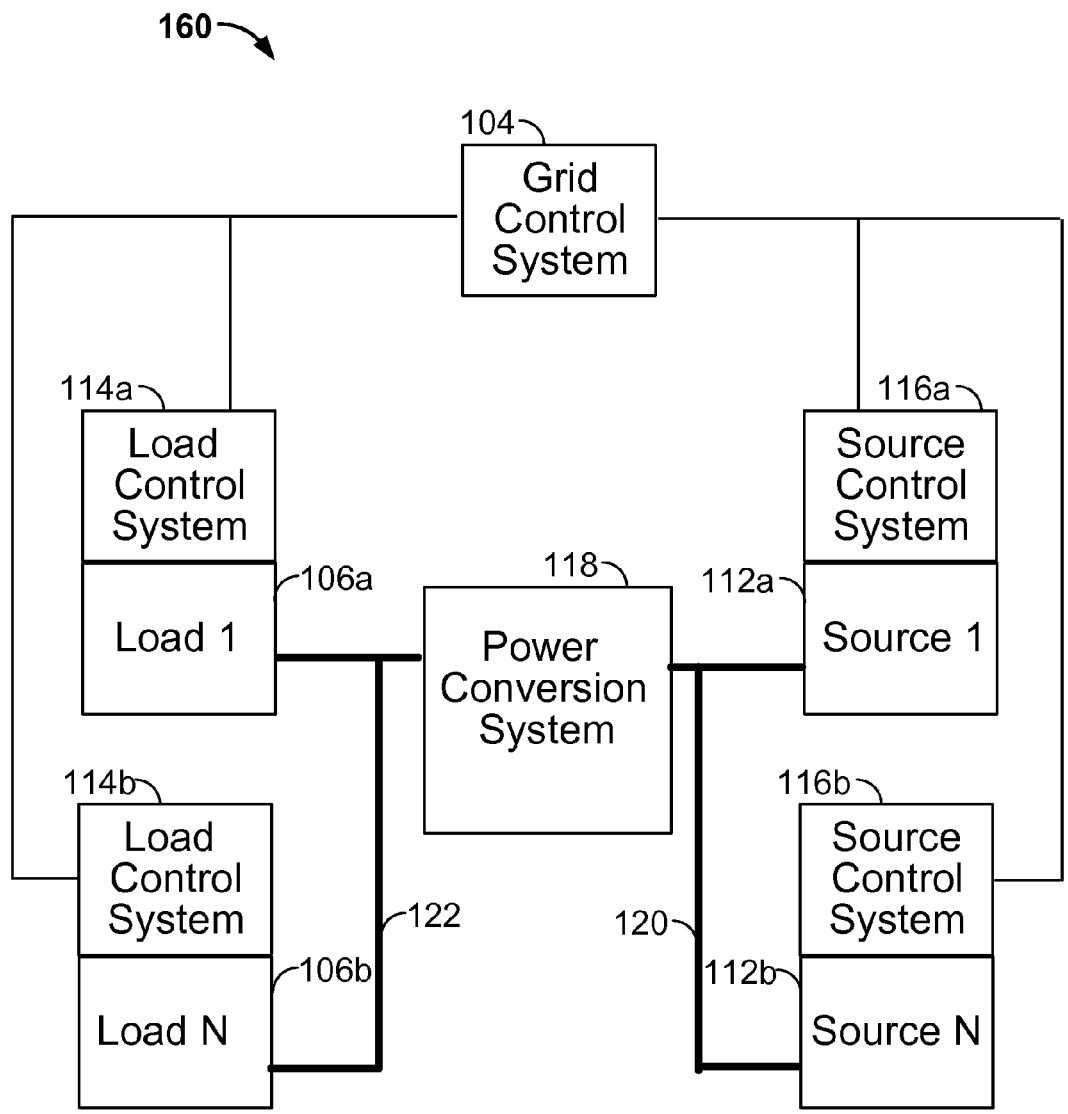
FIG. 1C is a block diagram of an example electrical system including several power sources and loads.

FIG. 1C is a block diagram of an example electrical system 160 including several power sources 112a-b and loads 106a-b. The power sources provide power to a first electrical grid 120 that is coupled to a second electrical grid 122 by a power conversion system 118. The loads draw power from the second electrical grid 122. In some implementations, the first electrical grid 120 carries direct current (DC) power and the second electrical grid carries alternating current (AC) power. The power conversion system can be, e.g., one or more DC to AC inverters.

The loads are each coupled to a respective load control system 114a-b. The load control systems are configured to adjust the amount of power drawn by the respective loads. For example, a load control system can include a power controller 108 and a communications device 110 as illustrated in FIG. 1A-B. Similarly, the power sources are each coupled to a respective source control system 116a-b. A source control system can include a power controller and a communications device. Although each of the loads and sources in FIG. 1C are illustrated as having a load control system or source control system, in some implementations, loads or sources lacking a control system may be coupled to one of the electrical grids 122 and 120.

The grid control system 104 is configured to receive source information from the first electrical grid 120 and determine load instructions for the load control systems on the second electrical grid 122 based on the source information. The grid control system 104 sends the load instructions to the load control systems, which individually implement the load control instructions.

For example, the grid control system 104 can receive source information that includes power source information, described above with respect to FIG. 1A, from the source control systems 116a-b. The grid control system 104 can also receive source information that includes a measurement of the electrical bus voltage on the first electrical grid 120, e.g., as measured by a measurement device in communication with the grid control system 104.

The grid control system 104 can also receive load information from the load control systems and use the load information to determine source instructions for the source control systems. The grid control system 104 sends the source instructions to the source control systems, which individually implement the load control instructions. In some implementations, the grid control system 104 receives source and load information and determines source and load instructions.

Figure 2:
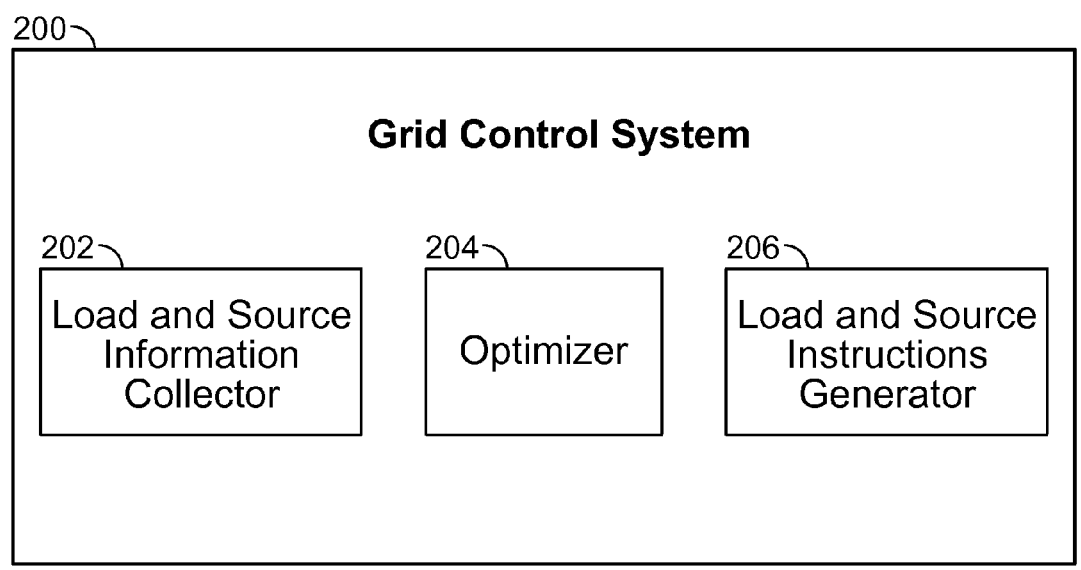
FIG. 2 is a block diagram of an example grid control system.

FIG. 2 is a block diagram of an example grid control system 200. The grid control system can be implemented on a system of one or more computers. For example, the grid control system can be a server on the Internet configured to provide load instructions to loads on various electrical grids. In another example, the grid control system can be a resident's personal computer for controlling the electrical grid in the resident's home.

The grid control system includes a load and source information collector 202. The collector receives load information from load control systems and source information from source control systems. For example, the collector can periodically poll the load and source control systems for load and source information, or the load and source control systems can push load and source information to the collector.

The grid control system includes an optimizer 204. The optimizer is configured to determine load and source dispatch curves that optimize one or more variables. For example, suppose that the load control systems provide priority ratings. The optimizer can optimize for priority by determining dispatch curves that specify that higher priority loads continue to receive power as lower priority loads are curtailed in order of priority. In another example, suppose that the source control systems provide bids that specify a price for an amount of power. The optimizer can optimize for price by determining dispatch curves that rely on lower cost power sources before higher cost power sources in order of price.

The optimizer can use any appropriate optimization algorithm. For example, the optimizer can use a brute force optimization algorithm that tests candidate dispatch curves until an optimum is found. In another example, the optimizer can use an Alternating Direction Method of Multipliers (ADMM) optimization algorithm.

The grid control system includes a load and source instructions generator 206. The generator uses the result of the optimizer to create instructions for load and source control systems and sends those instructions to the load and source control systems. A load instruction can be, e.g., a schedule for the load control system to adjust the power drawn from the electrical grid by the load at certain scheduled times. A load instruction can also be a schedule for the load control system to adjust the power drawn from the electrical grid as a function of a location condition measured by the load control system.

In some implementations, the source information from the source control systems, taken together, collectively represents an envelope of power levels that the power sources can collectively provide at certain times. In those implementations, the optimizer and instructions generator can determine, for each level of power availability from the power sources, an optimal combination of loads as a function of power availability.

In some implementations, the source information from the power sources includes, for each source, generation prices, one for each of a plurality of power levels that the source can supply. In those implementations, the optimizer and instructions generator can determine, for each level of power availability from the power sources, an optimal combination of loads as a function of power availability to reduce a total cost of power consumption.

Figure 3A:
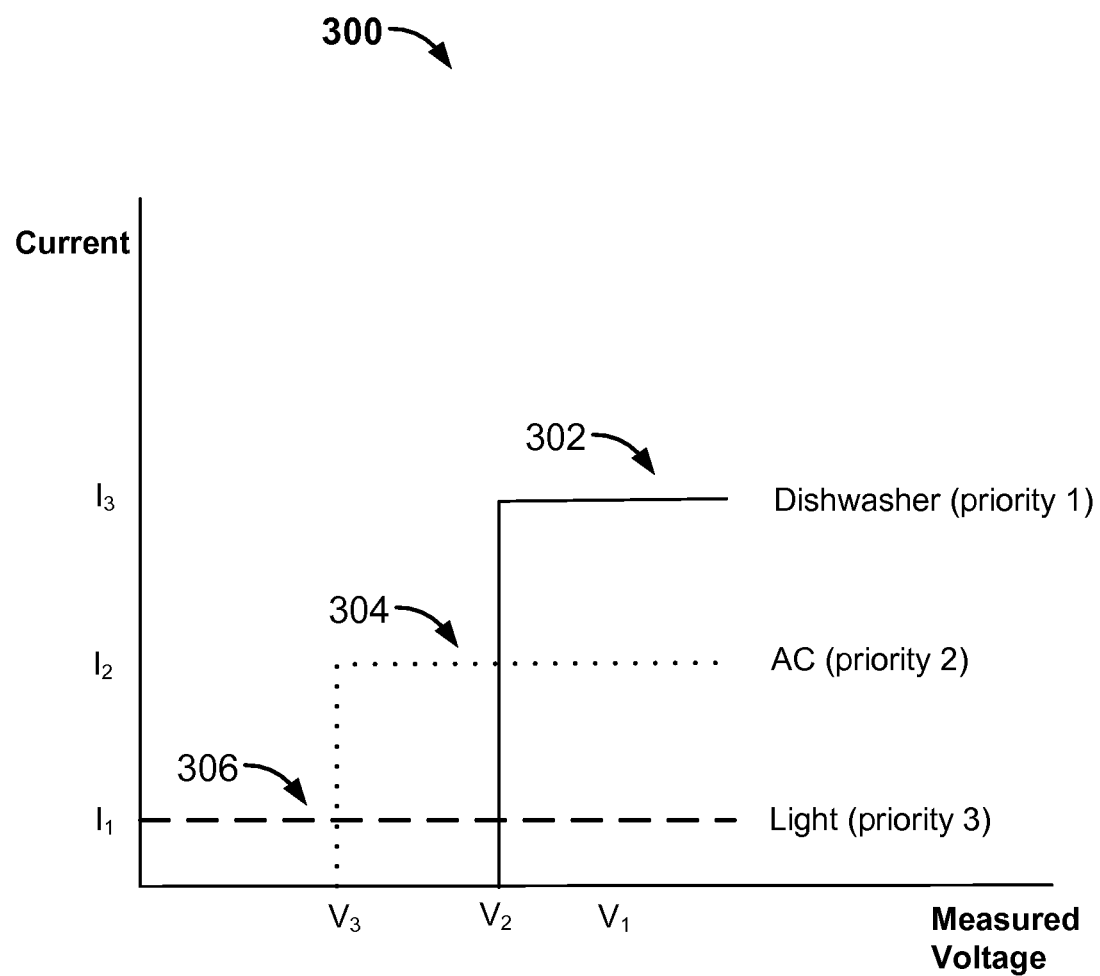
FIG. 3A is a diagram illustrating an example set of load instructions.

FIG. 3A is a diagram 300 illustrating an example set of load instructions. For purposes of illustration, consider an example electrical grid with three loads, a dishwasher, an air conditioning (AC) unit, and a light.

A load control system for the dishwasher sends load information to a grid control system specifying a priority rating of 1. A load control system for the AC sends load information to the grid control system specifying a priority rating of 2. A load control system for the light sends load information to the grid control system specifying a priority rating of 3.

The grid control system, in response, sends each of the load control systems a V/I curve as a load instruction. Curve 302 illustrates the dishwasher's load instruction, curve 304 illustrates the AC's load instruction, and curve 306 illustrates the light's load instruction. Each load control system measures the voltage on the electrical grid and adjusts the power drawn by its load according to the load instruction.

Suppose that when the measured voltage is $V_1$ that some number of power sources are together producing a sufficient amount of power for all three loads. Then, the power sources begin decreasing the amount of power supplied, e.g., because a battery is running low on power, or because a wind based power source is generating less power as the wind speed drops, or because a diesel generator is running low on diesel.

The grid voltage will droop when the power sources have less capacity. For example the power sources may be following instructions that tell them to lower the nominal voltage they are trying to drive; or they may be sent instructions telling them to follow a specific droop law.

When the dishwasher's load control system determines that the voltage on the grid has dropped to $V_2$, it curtails the dishwasher by cutting off its power. When the AC's load control system determines that the voltage has dropped to $V_3$, it curtails the AC by cutting off its power. The light control system, due to its high priority, will continue drawing power even as the voltage drops below $V_3$.

Figure 3B:
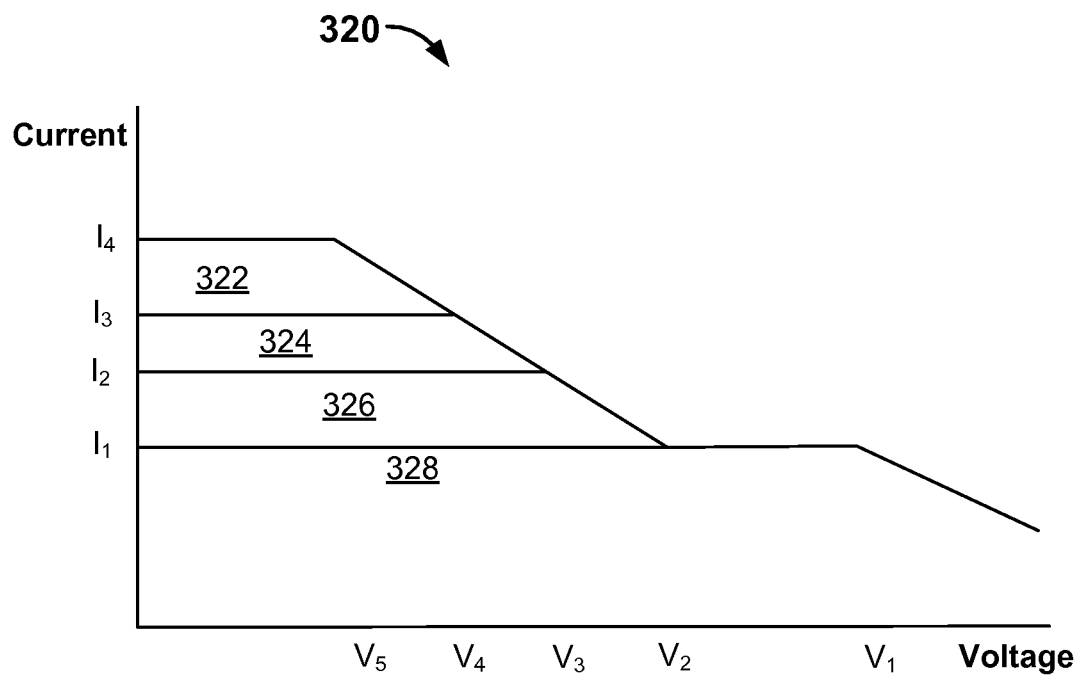
FIGS. 3B and 3C are diagrams and illustrating example source and load instructions.
Figure 3C:
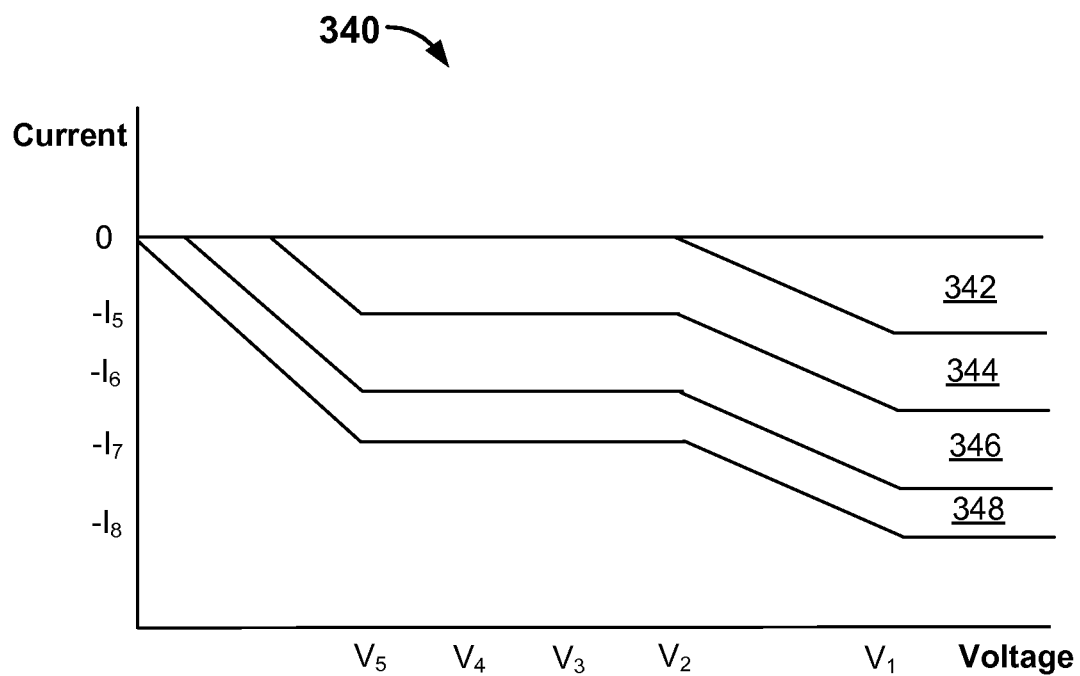

FIGS. 3B and 3C are diagrams 320 and 340 illustrating example source and load instructions. For purposes of illustration, consider an example electrical grid with four power sources and four loads. The power sources include a battery, first and second diesel generators, and a photovoltaic (PV) power source. The loads include battery charger, a heater, a washing machine, and lights.

FIG. 3B shows a potential voltage versus current (V-I) graph 320 including V-I curves for the power sources. A first region 322 under the curve illustrates the battery discharging. A second region 324 under the curve illustrates the first diesel generator producing power. A third region 326 under the curve illustrates the second diesel generator producing power. A fourth region under the curve 328 illustrates the PV power source producing power.

FIG. 3C shows a potential V-I graph 340 including V-I curves for the loads. A first region 342 under the curve illustrates the battery charging. A second region 344 under the curve illustrates the heater consuming power. A third region 346 under the curve illustrates the washing machine consuming power. A fourth region 348 under the curve illustrates the lights consuming power.

To illustrate the operation of the sources and loads, consider an example scenario where the voltage on the grid starts at V1 and drops over time to V5. The voltage can drop, for example, because an inverter for the PV power source drops the voltage as the PV power source produces less power.

At V1, the PV power source is producing all of the power, and the battery is charging. The loads are consuming relatively larger amounts of current. As the voltage drops from V1 to V2, the battery gradually charges at a slower rate, and the loads consume less and less current. At V2, the battery stops charging and the second diesel generator begins producing power. At V3, the first diesel generator begins producing power. At V4, the battery begins to discharge. At V5, as the voltage drops lower than V5, the loads again consume less and less current.

Figure 4:
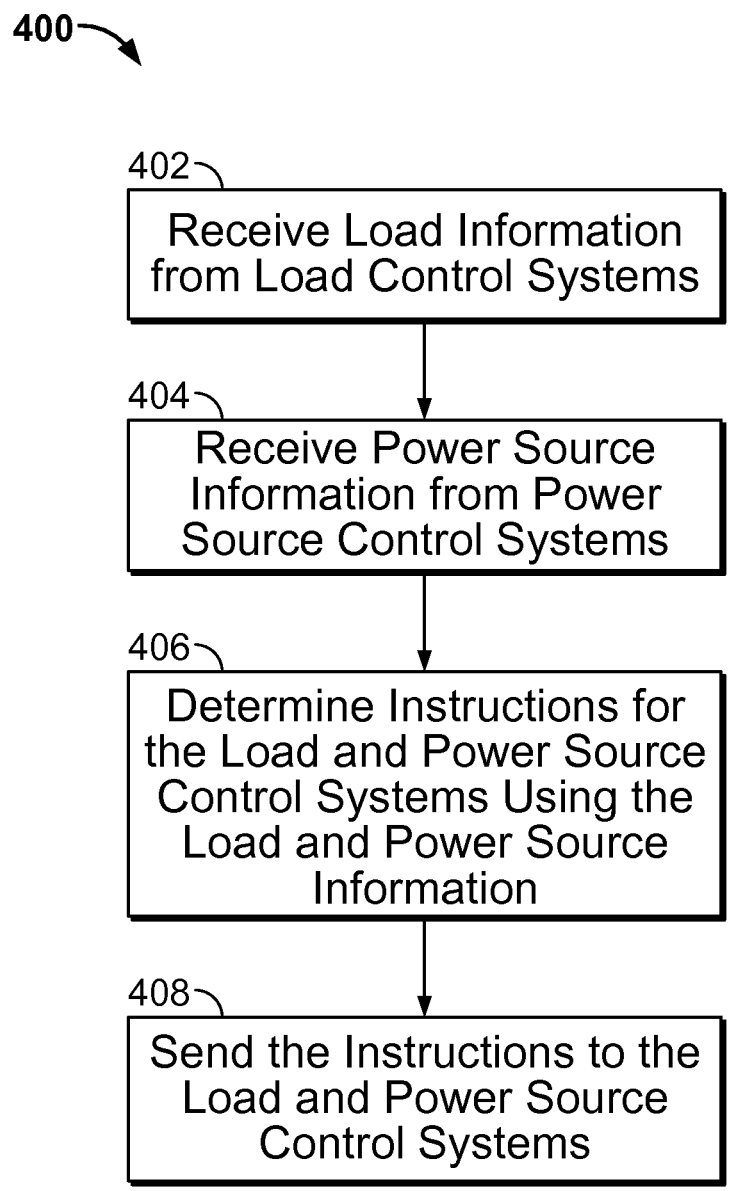
FIG. 4 is a flow diagram of an example process performed by a grid control system.

FIG. 4A is a flow diagram of an example process 400 performed by a grid control system. The grid control system receives load information from a number of load control systems (402). The grid control system receives power source information for a number of source control systems (404). The power sources can be coupled to a first electrical grid, and the loads can be coupled to a second electrical grid. The first and second electrical grids can be coupled together by a power conversion system.

The grid control system determines load and source instructions for the load and source control systems using the load and power source information (406). The grid control system sends the instructions to the load and power source control systems (408).

Figure 5:
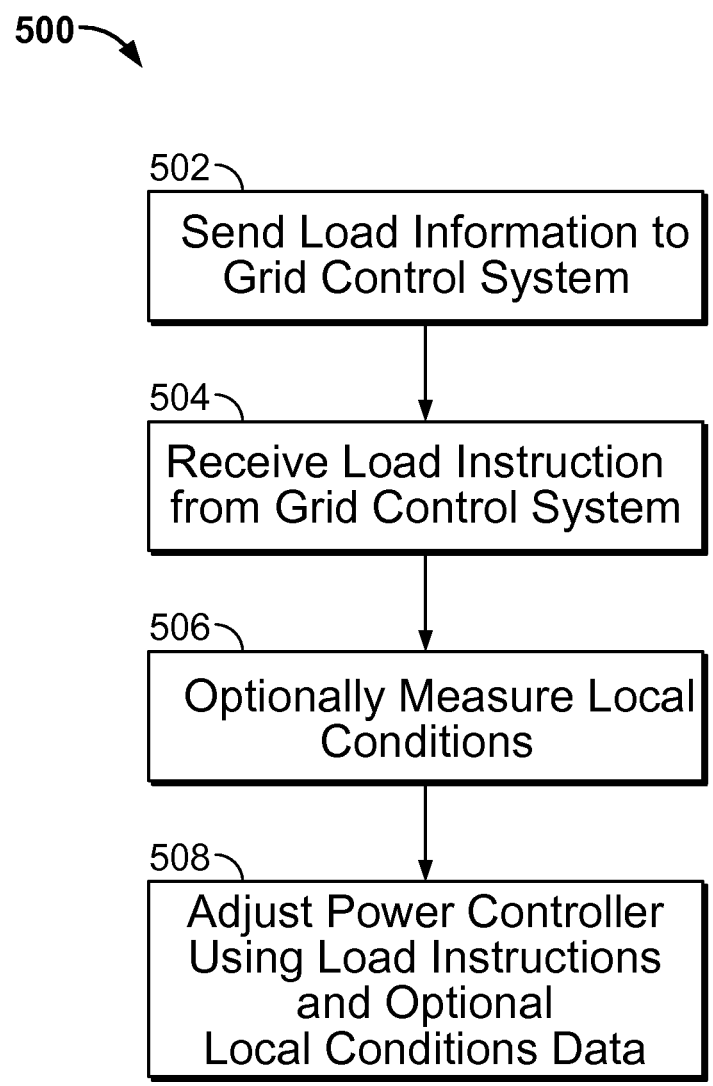
FIG. 5 is a flow diagram of an example process performed by a load control system.

FIG. 5 is a flow diagram of an example process 500 performed by a load control system. The load control system sends load information to a grid control system (502). The load control system receives a load instruction from the grid control system (504). If specified by the load instruction, the load control system measures one or more local conditions (506). The load control system adjusts a power controller for a load using the load instructions and any measured local conditions data (508).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificiallygenerated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A load management system comprising:
   a first electrical grid;
   one or more power sources coupled to the first electrical grid, each power source coupled to a respective source control system;
   a second electrical grid coupled to the first electrical grid by a power conversion system;

a plurality of loads coupled to the second electrical grid;
a plurality of load control systems, each load control system respectively coupled to the one of the loads; and
a grid control system configured to perform operations comprising:
receiving, from the plurality of load control systems, a plurality of priority ratings uniquely assigned to each of the plurality of loads, wherein the plurality of priority ratings for each of the plurality of loads are based on a time of day and each of the plurality of priority ratings individually change based on the time of day;
receiving source information from each source control system of the first electrical grid, wherein source information includes an envelope of power levels that the one or more powers sources can provide at various times;
based on the source information, the time of day, and a priority rating for each of the plurality of loads for a particular time of day, determining a respective load instruction for each of the load control systems; and
sending the load instructions to the load control systems, causing each load control system to adjust power drawn from the second electrical grid by the load control system's respective load based on the load control system's respective load instruction.

2. The load management system of claim 1, the operations comprising:
receiving load information from the load control systems, and wherein the load information characterizes at least one aspect of the power drawn by the load system's respective load, wherein determining respective load instructions comprises using the load information from each load, so that the load instruction for at least one load control system is based on the load information from at least one other load control system.

3. The load management system of claim 2, the operations comprising determining a respective source instruction for each of one or more source control systems coupled to the power sources and sending the source instructions to the source control systems, causing each source control system to adjust the power supplied to the first electrical grid by the source control system's respective source based on the source control system's respective source instruction.

4. The load management system of claim 1, wherein receiving source information from each source control system of the first electrical grid comprises receiving a measurement of a voltage on the first electrical grid.

5. The load management system of claim 1, wherein the power conversion system comprises a direct current (DC) to alternating current (AC) inverter configured to convert DC power on the first electrical grid into AC power on the second electrical grid.

6. The grid control system of claim 1, wherein determining a respective load instruction for each of the load control systems comprises determining a schedule for the load control system to adjust the power drawn from the second electrical grid by the load control system's respective load at a plurality of scheduled times.

7. The grid control system of claim 1, wherein determining a respective load instruction for each of the load control systems comprises determining a schedule for the load control system to adjust the power drawn from the second electrical grid as a function of a local condition measured by the load control system.

8. The grid control system of claim 7, wherein the local condition measured by the load control system comprises a measured voltage on the second electric grid, and wherein the schedule for the load control system comprises a plurality of power levels for a plurality of measured voltages.

9. The grid control system of claim 1, wherein receiving source information comprises receiving source information from each of a plurality of source control systems coupled to the power sources, and wherein the source information characterizes some aspect of the power supplied by the source control system's respective power source;
wherein the source information from the source control systems, taken together, collectively represents an envelope of power levels that the power sources can collectively provide at a plurality of times; and
wherein determining the load instructions comprises calculating, for each time of the plurality of times, an optimum combination of loads based on the power level that the power sources can collectively provide at that time.

10. The grid control system of claim 1, wherein receiving source information comprises receiving source information from each of a plurality of source control systems coupled to the power sources, and wherein the source information characterizes some aspect of the power supplied by the source control system's respective power source;
wherein the source information from each source control system comprises a plurality of generation prices, one for each of a plurality of power levels that the source can supply;
wherein determining the set of load instructions comprises determining, for each level of power availability of a plurality of levels of power availability from the power sources, an optimal combination of loads as a function of power availability to reduce a total cost of power consumption.

11. A method performed by a grid control system, the method comprising:
receiving, from a plurality of load control systems, a plurality of priority ratings uniquely assigned to each of a plurality of loads, wherein the plurality of priority ratings for each of the plurality of loads are based on a particular time of day and each of the plurality of priority ratings individually change based on the time of day;
receiving source information from one or more source control systems of a first electrical grid having one or more power sources coupled to the first electrical grid and each of the one or more power sources uniquely coupled to a source control system;
based on the source information, the time of day, and a priority rating for each of the plurality of loads for the particular time of day, determining a respective load instruction for each of the load control systems, the load controls systems each being coupled to a respective load coupled to a second electrical grid, the second electrical grid being coupled to the first electrical grid by a power conversion system; and
sending the load instructions to the load control systems, causing each load control system to adjust power drawn from the second electrical grid by the load control system's respective load based on the load control system's respective load instruction.

12. The method of claim 11, comprising:
receiving load information from the load control systems, and wherein the load information characterizes at least one aspect of the power drawn by the load system's respective load, wherein determining respective load instructions comprises using the load information from each load, so that the load instruction for at least one load control system is based on the load information from at least one other load control system.

13. The method of claim 12, comprising determining a respective source instruction for each of one or more source control systems coupled to the power sources and sending the source instructions to the source control systems, causing each source control system to adjust the power supplied to the first electrical grid by the source control system's respective source based on the source control system's respective source instruction.

14. The method of claim 11, wherein receiving source information from each source control system of the first electrical grid comprises receiving a measurement of a voltage on the first electrical grid.

15. The method of claim 11, wherein the power conversion system comprises a direct current (DC) to alternating current (AC) inverter configured to convert DC power on the first electrical grid into AC power on the second electrical grid.

16. The method of claim 11, wherein determining a respective load instruction for each of the load control systems comprises determining a schedule for the load control system to adjust the power drawn from the second electrical grid by the load control system's respective load at a plurality of scheduled times.

17. The method of claim 11, wherein determining a respective load instruction for each of the load control systems comprises determining a schedule for the load control system to adjust the power drawn from the second electrical grid as a function of a local condition measured by the load control system.

18. The method of claim 17, wherein the local condition measured by the load control system comprises a measured voltage on the second electric grid, and wherein the schedule for the load control system comprises a plurality of power levels for a plurality of measured voltages.

19. The method of claim 11, wherein receiving source information comprises receiving source information from each of a plurality of source control systems coupled to the power sources, and wherein the source information characterizes some aspect of the power supplied by the source control system's respective power source;
   wherein the source information from the source control systems, taken together, collectively represents an envelope of power levels that the power sources can collectively provide at a plurality of times; and
   wherein determining the load instructions comprises calculating, for each time of the plurality of times, an optimum combination of loads based on the power level that the power sources can collectively provide at that time.

20. The method of claim 11, wherein receiving source information comprises receiving source information from each of a plurality of source control systems coupled to the power sources, and wherein the source information characterizes some aspect of the power supplied by the source control system's respective power source;
   wherein the source information from each source control system comprises a plurality of generation prices, one for each of a plurality of power levels that the source can supply;
   wherein determining respective load instructions comprises determining, for each level of power availability of a plurality of levels of power availability from the power sources, an optimal combination of loads as a function of power availability to reduce a total cost of power consumption.

* * * * *